United States Patent
Brüse et al.

(10) Patent No.: US 11,771,106 B2
(45) Date of Patent: Oct. 3, 2023

(54) OIL COMPOSITION WITH MONO-ACYLGLYCERIDES

(71) Applicant: CARGILL, INCORPORATED, Wayzata, MN (US)

(72) Inventors: Falk Brüse, Drensteinfurt (DE); Frank Hollander, Ochten (NL); Gijsbertus Johannes Van Rossum, Spijkenisse (NL)

(73) Assignee: Cargill, Incorporated, Wayzata, MN (US)

(*) Notice: Subject to any disclaimer, the term of this patent is extended or adjusted under 35 U.S.C. 154(b) by 366 days.

(21) Appl. No.: 15/578,833

(22) PCT Filed: Jun. 1, 2016

(86) PCT No.: PCT/US2016/035153
§ 371 (c)(1),
(2) Date: Dec. 1, 2017

(87) PCT Pub. No.: WO2019/196547
PCT Pub. Date: Dec. 8, 2016

(65) Prior Publication Data
US 2018/0146691 A1    May 31, 2018

(30) Foreign Application Priority Data
Jun. 1, 2015 (EP) .................................. 15170026
Dec. 9, 2015 (EP) .................................. 15198671

(51) Int. Cl.
| | | |
|---|---|---|
| A23D 9/013 | (2006.01) |
| C11B 3/00 | (2006.01) |
| C11B 3/12 | (2006.01) |
| C11C 3/02 | (2006.01) |
| C11C 3/10 | (2006.01) |

(52) U.S. Cl.
CPC .............. *A23D 9/013* (2013.01); *C11B 3/00* (2013.01); *C11B 3/003* (2013.01); *C11B 3/12* (2013.01); *C11C 3/02* (2013.01); *C11C 3/10* (2013.01)

(58) Field of Classification Search
CPC . C11B 3/00; C11B 3/003; C11B 3/008; C11B 3/12; C11C 3/02; C11C 3/04; C11C 3/10
See application file for complete search history.

(56) References Cited

U.S. PATENT DOCUMENTS

| | | | | |
|---|---|---|---|---|
| 4,623,489 A | * | 11/1986 | Rivers, Jr. ............... | C11B 3/04 426/478 |
| 2013/0123525 A1 | * | 5/2013 | Ikemoto ................ | C11C 1/045 554/224 |
| 2013/0196393 A1 | * | 8/2013 | Haraldsson ........... | C11B 7/0075 435/134 |
| 2013/0323394 A1 | * | 12/2013 | Bruse ..................... | A23D 9/04 426/590 |

FOREIGN PATENT DOCUMENTS

| | | | | |
|---|---|---|---|---|
| CN | 1611122 A | 5/2005 | | |
| DE | 1020050610981 A | 6/2007 | | |
| WO | 0211543 A2 | 2/2002 | | |
| WO | WO-03094625 A1 | * 11/2003 | ............... | A23D 9/00 |
| WO | 2006043998 A1 | 4/2006 | | |
| WO | WO-2015050656 A2 | * 4/2015 | ............... | C11C 3/00 |

OTHER PUBLICATIONS

Bogalhos et al.."Monoglycerides and Diglycerides Synthesis in a Solvent-Free System by Lipase-Catalyzed Glycerolysis", Appl. Biochem Biotechnol (2008) 146:165-172. (Year: 2008).*
Cowan et al., "Reduction in Free Fatty Acids in Crude Palm Oil by Enzymatic Remediation", Journal of Palm Research vol. Dec. 24, 2012, p. 1492-1496. (Year: 2012).*
Chetpattananondh, Pakamas , et al., "Synthesis of high purity monoglycerides from crude glycerol and palm stearin", Songklanakarin Journal of Scinece and Technology, Retrived online:http://rdo.psu.ac.th/sjstweb/journal/30-4/0125-3395-30-4-515-521.pdf, XP055225755, Jul. 1, 2008, 515-521.
Prasanth Kumar PK , et al., "Impact of different deacidification methods on quality characteristics and composition of olein and stearin in crude red palm oil", Journal of Oleo Science, 2014;63(12):1209-21. Epub Nov. 12, 2014.
Zhang, Hong , "Evaluation of practical process aspects for Lipozyme TL IM catalyzed bulk fat modification in a batch reactor", The Open Biotechnology Journal,, Dec. 26, 2007, 72-80.

* cited by examiner

*Primary Examiner* — Changqing Li

(57) ABSTRACT

The present invention relates to a process for preparing a deodorized oil with in-situ prepared mono-acylglycerides and the oil obtained as such. It relates to a process for preparing a deodorized oil containing in-situ prepared mono-acylglycerides by interesterifying in presence of an enzyme a glyceride containing fraction wherein the ratio of free and esterified hydroxyl groups (OH) to free and esterified fatty acids (FA) is greater than 1.07 and obtaining an oily composition containing less than 1% w/w, preferably less than 0.5% free fatty acids. Furthermore it relates to a deodorized oil containing 30 to 70% triglycerides, 20 to 50% di-acyl glycerides, 1.5 to 25% mono-acyl glycerides.

10 Claims, No Drawings

OIL COMPOSITION WITH MONO-ACYLGLYCERIDES

CROSS-REFERENCE TO RELATED APPLICATIONS

This application is a national phase application of international application PCT/US2016/035153, filed Jun. 1, 2016, entitled "OIL COMPOSITION WITH MONO-ACYLGLYCERIDES", which application claims the benefit of European Patent Application Serial No. 15170026.7 filed Jun. 1, 2015, entitled "OIL COMPOSITION WITH MONO-ACYLGLYCERIDES", and European Patent Application Serial No. 15198671.8 filed Dec. 9, 2015, entitled "OIL COMPOSITION WITH MONO-ACYLGLYCERIDES", which applications are hereby incorporated by reference herein in their entirety.

FIELD OF THE INVENTION

The present invention relates to a process for preparing a deodorized oil with in-situ prepared mono-acylglycerides and the oil obtained as such.

BACKGROUND OF THE INVENTION

Many familiar foods exists as emulsions at least at some stage during their production. These foods include processed foods such as cream, margarine, fruit beverages, soups, cake batters, mayonnaise, sauces, desserts, ice cream, just to name a few of them. The overall quality of a particular emulsion-based food product is determined by a combination of physicochemical and sensory characteristics, such as appearance, aroma, taste, shelf-life, texture but also other features such as labeling give a certain perception to the consumer.
One class of frequently used food emulsifying agents includes the mono-acylglycerides (MAG). They are typically based on fats and oils such as sunflower, palm or soybean oils.

It would be desirable to have a process which allows the preparation of an emulsifying oil without adding foreign material.

The current invention provides such a process.

SUMMARY OF THE INVENTION

The current invention relates to a process for preparing a deodorized oil containing in-situ prepared mono-acylglycerides wherein the process is comprising the following steps:
a) Hydrolysing a triglyceride oil with water in presence of an enzyme and obtaining an hydrophobic phase wherein up to 50% w/w of free fatty acids are formed,
b) Removing from 20% to 100% w/w of the formed free fatty acids for maintaining a glyceride containing fraction wherein the ratio of free and esterified hydroxyl groups (OH) to free and esterified fatty acids (FA) is greater than 1.07,
c) condensing and/or interesterifying in presence of an enzyme the glyceride containing fraction, and
d) collecting a deodorized oil containing less than 1% w/w, preferably less than 0.5% free fatty acids and containing from 1.5 to 25% mono-acyl glycerides.

It further relates to a deodorized oil containing 30 to 70% triglycerides, 20 to 50% di-acyl glycerides, 1.5 to 25% mono-acyl glycerides and less than 0.1% free fatty acids.

DETAILED DESCRIPTION

The current invention relates to a process for preparing a deodorized oil containing in-situ prepared mono-acylglycerides wherein the process is comprising the following steps:
a) Hydrolysing a triglyceride oil with water in presence of an enzyme and obtaining an hydrophobic phase wherein up to 50% w/w of free fatty acids are formed,
b) Removing from 20% to 100% w/w of the formed free fatty acids for maintaining a glyceride containing fraction wherein the ratio of free and esterified hydroxyl groups (OH) to free and esterified fatty acids (FA) is greater than 1.07,
c) condensing and/or interesterifying in presence of an enzyme the glyceride containing fraction, and
d) collecting a deodorized oil containing less than 1% w/w, preferably less than 0.5% free fatty acids and containing from 1.5 to 25% mono-acyl glycerides.

It should be noted that all percentages are expressed as weight percentage, unless otherwise explicitly mentioned.

Furthermore the ratio of (OH) to (FA) each time refers to the ratio of (free and esterified hydroxyl groups (OH)) to (free and esterified fatty acids (FA)), unless otherwise explicitly mentioned.

The triglyceride oil can be selected from the tropical oils, palm oil, palm kernel oil and coconut oil, or babassu oil, and/or their corresponding fractions. Furthermore, the triglyceride oil may also be rapeseed oil, canola oil, sunflower oil, high oleic sunflower oil, soybean oil, corn oil, peanut oil, walnut oil, hazelnut oil, olive oil, camelina oil, linseed oil, hemp oil, safflower oil, cottonseed oil and varieties of these oils having altered fatty acid compositions such as high oleic, low linolenic or low saturated oils (e.g. high oleic canola oil, low linolenic soybean oil or high stearic sunflower oil), and mixtures of one or more thereof.
Preferably sunflower oil, rape seed oil, palm or soybean oils, more preferably palm stearin is used as the triglyceride oil for the hydrolysis.

The enzymatic hydrolysis of the triglyceride oil is performed in presence of water and enzyme and thus forming a system consisting of a hydrophilic liquid phase (water) and a hydrophobic liquid phase. There is no need for the addition of glycerol and/or low aliphatic esters. The enzyme can be present in the hydrophilic phase or it is immobilized on a carrier. Hydroxyl groups get enriched in the hydrophilic phase, while fatty acids get enriched in the hydrophobic phase. The hydrolysis is continued until a content of up to 50% w/w of free fatty acids is obtained in the hydrophobic phase.

The removal of the formed free fatty acids is generating the glyceride containing fraction having a ratio of hydroxyl groups (OH) to fatty acids (FA) of greater than 1.07. This removal can be done in many different ways. From 20% to 100 weight % of the formed free fatty acids can be removed, depending upon the applied method. In fact, the free fatty acids can be decanted, neutralized and/or distilled off.

Decantation will allow to remove 20 to 80% w/w of the excess of free fatty acids, thus leaving a system of hydrophobic and hydrophilic phase enriched in hydroxyl-groups, which corresponds to the glyceride containing fraction wherein the ratio of hydroxyl groups (free or esterified OH) to fatty acids (free and esterified fatty acids FA) is greater than 1.07. This glyceride containing fraction is further condensed and/or interesterified to prepare a deodorized oil rich in mono-acylglycerides and deficient or containing less than 1% w/w, preferably less than 0.5% free fatty acids. In practice, this can for instance be achieved by removing water under vacuum in presence of the enzyme, and potentially having an additional reaction time of from 1 to 36 hours.

In another aspect of the invention, 20 to 100 weight % FFA is removed by deodorization, distillation or short path evaporation. Deodorization is explained below and short path evaporation is a distillation technology that involves the use of a distillation equipment wherein the distillate is travelling over a short distance, often only a few centimetres, and it is normally done at reduced pressure. The advantage of this distillation technology is that the heating temperature can be considerably lower (at reduced pressure) than the boiling point of the liquid at standard pressure, and the distillate only has to travel a short distance before condensing. A short path distillation further ensures that little amount of product is lost on the walls of the equipment. The short path evaporation is performed at a temperature of from 150° to 210° C.

In yet another aspect of the invention, the free fatty acids can also be neutralized by means that are commonly known, such as washing out or precipitating with alkali, earth alkali salts, preferably sodium or calcium salts. The remaining fraction (after the removal of the free fatty acids) is in each aspect of the invention, the glyceride containing fraction having a ratio of hydroxyl groups (OH) to fatty acids (FA) of greater than 1.07.

By removing the formed free fatty acids by neutralisation or distillation, the residual fraction is condensed for obtaining a glyceride containing fraction with less than 1% of free fatty acids and more than 1% of mono-acylglycerides.

Alternatively, a hydroxyl enriched fraction (is glyceride containing fraction having a ratio of hydroxyl groups (OH) to fatty acids (FA) of greater than 1.07) can be obtained by starting with a commercially available oil containing significant amounts of di-acyl-glycerides (DAG), such as from 5 to 15% of DAG, and whereby a distillation process is used to enrich DAG in the distillate fraction. The distillation can be a (regular) distillation, deodorisation or short path evaporation. The distillate fraction is the glyceride containing fraction having a ratio of hydroxyl groups (OH) to fatty acids (FA) of greater than 1.07. An appropriate example might be a DAG fraction from palm oil obtained through the short path evaporation of palm oil.

The distillate (e.g. from the short path evaporation), which is the DAG-rich fraction containing at least 20% w/w of di-acyl-glycerides (DAG) is further used in the condensation and/or interesterification step.

Without being bound to a specific and/or limited scientific explanation it is hereby understood that the in-situ preparation of the current invention which occurs in presence of water has certain advantages over existing processes that are based upon glycerolysis in presence of methyl esters or addition of glycerol. The current invention does not need the addition of methyl esters, low aliphatic alcohols and/or glycerol and there is no need for glycerol labelling and no need for extra supply of glycerol which can reduce investment costs in respect of feed equipment and storage.

The hydrolysis and the condensation and/or interesterification step, whenever applicable, use enzymes that may be the same, or may be mono/di-acyl selective enzymes.

Furthermore the enzymes are selected from phospoholipases, and lipases. The enzymes may be used in solution or can be immobilised and as such have an impact on the purification of the reaction medium and stability of the enzyme. As mentioned before, the enzyme applied in the hydrolysis (whenever needed) and the enzyme used in the interesterification can have the same or different selectivity and likewise can have the same stability or different.

Lipases are classified according to the sources from which they are obtained, such as microorganism (fungi or bacteria), animal and plant. Most lipases applied are derived from fungal or bacterial sources. Some of the most widely used fungal lipases are derived from various species within genera such as *Candida, Yarrowia, Aspergillus* and *Penicillium*, while bacterial lipases often come from *Pseudomonas* sp., *Bacillus* sp., *Staphylococcus* sp., *Burkholderia* sp. and many others. Bacterial lipases and esterases have been classified into eight families (and several subfamilies) based on sequence homology and biological properties. Lipases from animal origin have been originated from various organs and tissues of several mammalian species, among which the pancreatic lipases are the most thoroughly studied. Plant lipases have not received the same attention as those from other sources, but oilseed lipases have been of greatest interest among the plant lipases. An non-exhaustive, non-limiting list of suitable lipases includes, lipase derived from *Candida cylindracea, Candida lipolytica, Candida rugosa, Candida antarctica, Candida utilis, Chromobacterium viscosum, Geotrichum viscosum, Geotrichum candidum, Mucor javanicus, Mucor miehei, Porcine pancreas, Pseudomonas* species, specifically *Pseudomonas fluorescens, Pseudomonas cepacia, Pseudomonas pseudoalkaligenes, Pseudomonas alkaligenes, Thermomyces* species, *Rhizopus arrhizus, Rhizopus delemar, Rhizopus niveus, Rhizopus oryzae, Rhizopus javanicus, Aspergillus niger, Penicillium roquefortii, Penicillium camembertii* or an esterase derived from *Bacillus* species, specifically *Bacillus thermoglucosidasius; Mucor miehei*, Horse liver, *Saccharomyces cerevisiae*, Pigs liver or combinations thereof.

Phospholipases are classified as types $A_1$, $A_2$, C, and D, each with different bond selectivities.

For example, the hydrolysis of palm stearin is preferably performed in presence of a lipase, such as Lipozyme TL or Lipozyme 435 (earlier known as Novozyme 435).

This hydrolysis may result in a composition that is containing from 25-50% of free fatty acids. Decantation of up to 80% of the hydrophobic phase of the composition is followed by a condensation and/or interesterification reaction under reduced pressure that allows the removal of water to shift the equilibrium in presence of a lipase and it is resulting in an oily composition (oil) containing less than 0.5% free fatty acids, and from 1% to 10% mono-acylglycerides (MAG).

Specifically, palm stearin is hydrolysed in presence of 5-10% water and lipase and a hydrolysed mixture containing 25-50% of free fatty acids is formed. 50% of the hydrophobic part of the hydrolysed mixture is removed by decantation and the residual part is condensed to get an oily composition (oil) containing less than 0.5% free fatty acids and from 6 to 10% of mono-acylglycerides. For the hydrolysis a lipase such as for instance Lipozyme TL 100 can be used and for the condensation a lipase like Lipozyme 435 can be applied. The composition is filtered to remove the enzyme, followed by bleaching and deodorisation. The finished product is a deodorized oil comprising more than 4% w/w of in-situ prepared mono-acylglycerides.

Alternatively, the triglyceride oil is hydrolysed in presence of a MAG/DAG selective enzyme that more efficiently creates free glycerol. The mixture obtained after the hydrolysis is containing from 25 to 40% free fatty acids and by decantation of less than 50% of the hydrophobic phase followed by a condensation and/or interesterification reaction of the remaining phase under reduced pressure, that allows the removal of water to shift the equilibrium, a deodorized oil containing less than 1% free fatty acids, and 6-10% mono-acylglycerides (MAG) is obtained.

Finally, the oily composition (oil) containing less than 1% w/w free fatty acids, is purified by filtering off the enzyme. Further purification can be achieved through bleaching. Bleaching as such can be applied in general or to perform removal of the remaining enzyme.

Bleaching

The nature and operation of the bleaching system will depend, at least in part, on the nature and quality of the oily composition being bleached. Generally, the oil will be mixed with a bleaching agent which combines with oxidation products, trace phosphatides, trace soaps, and other compounds adversely affecting the colour and flavour of the composition. As is known in the art, the nature of the bleaching agent can be selected to match the nature of the oily composition to yield a desirable bleached glyceride containing fraction. Bleaching agents generally include natural or "activated" bleaching clays, also referred to as "bleaching earths", activated carbon and various silicates. A skilled person will be able to select a suitable bleaching agent from those that are commercially available.

The composition is further refined by deodorisation.

Deodorising

The deodorising process and its many variations and manipulations are well known in the art and in the current invention a low-temperature deodorisation is applied. Preferably, it will include introducing the glyceride composition or the refined oily composition into a deodoriser and contacting it with steam to vaporize and drive off free fatty acids while maintaining the mono-acylglycerides into the glyceride containing fraction.

The deodoriser may be any of a wide variety of commercially available deodorizing systems, including both multi-chamber deodorisers (such as those sold by Krupp of Hamburg, Germany; De Smet Group, S.A. of Brussels, Belgium; Gianazza Technology s.r.l. of Legnano, Italy; Alfa Laval AB of Lund, Sweden, or others) and multi-tray deodorisers (such as those sold by Krupp, DeSmet Group, S.A., and Crown Ironworks of the United States).

The deodoriser is desirably maintained at an elevated temperature not higher than 210° C., preferably not higher than 190° C. and a reduced pressure to better volatilise the FFA. According to one possible embodiment of the invention, the deodoriser will be maintained at a pressure of no greater than 10 mm Hg. Preferably, it will be maintained at a pressure of no greater than 5 mm Hg, e.g., 1-4 mm Hg.

The lower deodorisation temperatures provide at least two advantages:
  avoiding the distillation of mono-acylglycerides, and
  avoiding the formation of unwanted compounds such as, epoxypropanol fatty acid esters.

The current invention relates to a deodorized oil containing 30 to 70% triglycerides, 20 to 50% di-acyl glycerides, 1.5 to 25% mono-acyl glycerides. The current invention further relates to the deodorized oil wherein the mono-acylglycerides are present in an amount of from 3% to 15%, more preferably from 5% to 10%. Furthermore it relates to the deodorized oil of the current invention wherein the di-acyl glycerides are present in an amount from 30 to 46%. More specifically, it relates to the deodorized oil of the invention wherein the amount of triglycerides is from 35 to 65%, the amount of di-acyl glycerides is from 30 to 46%, the amount of mono-acyl glycerides is from 3 to 10%.

Very specific examples are the deodorized oils containing 62% tri-acylglycerides (TAG), 33% di-acyl glycerides (DAG), 3% mono-acylglycerides (MAG), or containing 35% TAG, 45% DAG, 9% MAG, or containing 7% MAG, 34% DAG, 54% TAG, or containing 5% MAG, 34% DAG, and 58% TAG.

The presence of in-situ prepared mono-acylglycerides has the significant advantage that the obtained deodorized oil is emulsifying without the addition of any foreign material. In fact no foreign material is added, while extremely low quantities of residues form the in-situ preparation are distinguishing the deodorized oils containing in-situ prepared mono-acylglycerides from existing oils that may contain mono-acyl glycerides that are explicitly added to the oil.

Additionally, the deodorized oil of the current invention is low in unwanted components such as epoxypropanol fatty acid esters. These unwanted epoxypropanol fatty acid esters are present in an amount below 500 ppb, preferably below 300 ppb, even more preferably below 150 ppb.

The deodorized oil of the current invention has all the benefits from the presence of a significant amount of mono-acylglycerides and absence of free fatty acids and absence of unwanted epoxypropanol fatty acid esters.

The presence of in-situ mono-acylglycerides provides a deodorized oil with suitable emulsifying properties and without presence of foreign material that would require addition of mono-acylglycerides through an extra process step.

The invention will hereunder be illustrated in the following examples.

EXAMPLES

Example 1

Palm Stearin (Low MAG)

37.5 kg Palm Stearin (Cargill Botlek) was mixed in Pilot reactor with 3 l water at 70° C. 200 g Lipozyme 435 was added. After 48 h the content of FFA was 23.7%. Stirring was stopped and after 30 minutes settling, 15 kg of the upper layer were taken out from the reactor. The stirring was started again, and carefully vacuum was applied to remove water and initiate condensation. After 22 h at 50-100 mbar, FFA was 1.0%. According gel permeation chromatography (GPC), the composition was 62% TAG, 33.2% DAG, 3.4% MAG, and 0.8% FFA according titration.

Example 2

Palm Stearin (High MAG)

37.5 kg Palm Stearin (Cargill Botlek) was mixed in Pilot reactor with 5 l water at 70° C. 300 g Lipozyme 435 was added. After 94 h the content of FFA was 36.7%. Stirring was stopped and after 30 minutes settling, 16 kg of the upper layer were taken out from the reactor. The stirring was started again, and carefully vacuum was applied to remove water and initiate condensation. After 29 h at 50-100 mbar, FFA was 0.99%. According gel permeation chromatography (GPC), the composition was 35.25% TAG, 45.51% DAG, 8.94% MAG, and 0.96% FFA according titration.

Example 3

DAG From Short Path Evaporation (SPE) Distillate 100 g distillate fraction from a short path evaporation of RBD Palm Oil with 1.8% MAG, 49% DAG, 42% TAG was interesterified under vacuum using 1% Lipozyme TL IM. After 48 h product was isolated by filtration. Composition of the final material was 6.5% MAG, 34% DAG, 54% TAG according Gel Permeation Chromatography with FFA of 0.23% according titration.

Example 4

DAG From SPE Distillate 100 g distillate fraction from a short path evaporation of RBD Palm Oil with 1.7% MAG, 48% DAG, 47% TAG was interesterified under vacuum using 1% Lipozyme 435. After 48 h product was isolated by filtration. Composition of the final material was 5.3% MAG, 33.5% DAG, 58% TAG according Gel Permeation Chromatography with FFA 0.58% according titration.

The invention claimed is:

1. A process for preparing a deodorized oil containing in-situ prepared mono-acylglycerides wherein the process consisting of the following steps:
    a) hydrolyzing a triglyceride oil with water in the presence of a hydrolyzing enzyme and obtaining a hydrophobic phase wherein up to 50% w/w of free fatty acids are formed,
    b) removing from 20% to 100% w/w of the formed free fatty acids and maintaining a glyceride containing oil fraction wherein the ratio of free and esterified hydroxyl groups (OH) to free and esterified fatty acids (FA) is greater than 1.07,
    c) interesterifying the glyceride containing oil fraction of b), wherein the interesterifying is carried out in a composition consisting of the glyceride oil fraction of b) and an interesterifying enzyme, so as to yield a deodorized oil, and
    d) collecting the deodorized oil from c) containing less than 1% w/w free fatty acids and containing from 1.5 to 25% w/w of mono-acylglycerides, 35 to 65% w/w of triacylglycerides, and 20 to 50% w/w of di-acylglycerides; and
    e) optionally freeing the collected deodorized oil of d) from the enzyme of a) and/or c) by filtration and/or bleaching;
    f) optionally deodorizing the collected deodorized oil of d) at a temperature of from 150° C. to 210° C.;

wherein:
    the triglyceride oil is selected from the group consisting of tropical oils, palm oil, palm kernel oil, palm stearin, coconut oil, babassu oil, rapeseed oil, canola oil, sunflower oil, high oleic sunflower oil, soybean oil, corn oil, peanut oil, walnut oil, hazelnut oil, olive oil, camelina oil, linseed oil, hemp oil, safflower oil, cottonseed oil, high oleic cottonseed oil, low linolenic cottonseed oil, high oleic canola oil, low linolenic soybean oil, high stearic sunflower oil, and mixtures thereof.

2. The process according to claim 1 wherein the collected deodorized oil of d) contains less than 0.5% w/w free fatty acids.

3. The process according to claim 1 wherein the collected deodorized oil of d) is freed from the enzyme of a) and/or c) by filtration and/or bleaching.

4. The process according to claim 1 wherein the collected deodorized oil of d) is bleached.

5. The process according to claim 1 wherein the collected deodorized oil of d) is deodorized at a temperature of from 150° C. to 210° C.

6. The process according to claim 1 wherein in step b) the formed free fatty acids are removed by decanting 20 to 80% w/w of the hydrophobic phase and maintaining the glyceride containing oil fraction wherein the ratio of free and esterified hydroxyl groups (OH) to free and esterified fatty acids (FA) is greater than 1.07.

7. The process according to claim 1 wherein in step b) the glyceride containing oil fraction is obtained by neutralizing, deodorizing and/or distilling the formed free fatty acids.

8. The process according to claim 1 wherein in step a) the enzyme is a mono/di-acylglyceride selective enzyme.

9. The process according to claim 1 wherein the interesterifying enzyme of c) and the hydrolyzing enzyme of a) are different in selectivity and/or stability.

10. The process of claim 1, wherein the glyceride containing oil fraction is a di-acylglyceride rich product containing 30 to 46% w/w of di-acylglycerides.

* * * * *